United States Patent [19]

Glass

[11] 4,013,872

[45] Mar. 22, 1977

[54] TEMPERATURE CONTROL DEVICE

[75] Inventor: John R. Glass, Mickleton, N.J.

[73] Assignee: Mobil Oil Corporation, New York, N.Y.

[22] Filed: May 2, 1975

[21] Appl. No.: 574,075

[52] U.S. Cl. .............................. 219/497; 219/494; 323/68

[51] Int. Cl.² .......................................... H05B 1/02

[58] Field of Search ......... 307/310; 323/19, 225 C, 323/24, 60, 68; 219/494, 497, 499, 501, 504, 505

[56] References Cited

UNITED STATES PATENTS

| | | | |
|---|---|---|---|
| 3,259,825 | 7/1966 | James | 219/501 |
| 3,523,182 | 8/1970 | Phillips et al. | 219/501 |
| 3,553,429 | 1/1971 | Nelson | 219/499 X |
| 3,584,291 | 6/1971 | Budniak | 323/19 X |
| 3,639,824 | 2/1972 | Malavasi | 323/19 X |

Primary Examiner—J D Miller
Assistant Examiner—Fred E. Bell
Attorney, Agent, or Firm—Charles A. Huggett; Malcolm Keen

[57] ABSTRACT

A temperature control device generates a signal proportional to deviations of the temperature from a predetermined set point. This first signal is averaged and a second signal produced in response to it. This second signal deviates from a reference level periodically for a duration proportional to the first signal, e.g. a square signal of variable on/off ratio. This signal is filtered to produce a sloping signal and this signal is, in turn, combined with the first signal to regulate the heat supply.

22 Claims, 5 Drawing Figures

TEMPERATURE CONTROL DEVICE

CROSS REFERENCE TO RELATED APPLICATIONS

My co-pending patent application Ser. No. 573,689 and now abandoned, of even date herewith discloses and claims the alarm and monitor circuit used with the temperature controller.

BACKGROUND OF THE INVENTION

1. Field of the Invention

This invention is concerned with temperature control devices and more specifically with a thermostatic temperature control for heating baths.

2. Description of the Prior Art

Thermostatic control of temperature using various types of temperatures sensitive switches is known. These switches provide for on-off control of the heaters with the temperature of a temperature-controlled environment e.g. a bath, moves outside certain prescribed limits. The disadvantage of this type of control is that the temperature tends to vary excessively because the heater is turned on full for either a small or a large deviation, from the set point. Conversely, the heater will be turned completely off when the upper set point is reached even though it would be desirable to maintain a small input of heat to balance the inevitable losses.

Another disadvantage of existing systems is that the power of the heater must be carefully chosen according to the thermal capacity of the bath. Thus, if a given heater is used in a smaller bath or if a different medium is used in the bath, for example oil instead of water, the heating rate will be different and this may cause excessive variations of bath temperature.

The use of solid state electronic control circuits makes the proportional control of the heaters possible. For example, a thermistor whose resistance varies with temperature may be used to control the triggering of a thyristor in series with the load and the a.c. supply so that the thyristor is triggered at different times during the A.C. cycle. Such a circuit is described, for example, in Source book of Electronic Circuits, McGraw-Hill, pages 755 and 762. The disadvantages of this type of circuit, however, is that radio frequency interference may be caused. The strength of this R.F. interference increases in proportion to the power of the equipment. When powerful systems are used in areas where sensitive electronic apparatus is being used, this may cause serious trouble.

In addition to the need to provide a proportional response to temperature deviations, there is also a need to provide a so-called "reset" response, that is, a response which is delayed by a factor which corresponds to the thermal response time of the bath. For example, a thermistor may detect a change in the temperature of a temperature-controlled bath and may trigger a response before the bath as a whole has responded to a previous response. This can be avoided by delaying the control responses by an amount of time corresponding to the time constant of the bath. The reset response can be used to correct minor, but long-duration deviations from the set-point since it essentially functions in response to the time integral of the temperature deviation.

Up to now, it has been possible to obtain both proportional and reset control of temperature only by using a separate circuit for each of the two control responses, this complicates the control devices and, moreover, decreases their reliability because of the greater number of separate circuit elements involved.

I have now devised a way of controlling the temperature of a temperature-controlled environment which combines reset and proportional control and which enables both control responses to be obtained from one circuit.

According to the present invention the method of controlling the temperature of a temperature-controlled environment comprises:

1. sensing the temperature of the environment,
2. generating a first signal in proportion to a deviation of the temperature from a reference temperature,
3. varying the duration of the deviation of a second signal from a reference level in response to the first signal,
4. deriving from the second signal a third signal having a value which varies with time,
5. controlling the supply of heat to the environment in response to the first and third signals.

In a preferred embodiment of the invention, the second signal is a square wave signal whose on/off ratio is varied in proportion to the temperature of the environemt. This square wave signal can be filtered to produce a signal with sloping edges (the third signal) which is then combined with the first signal to control the heat flow to the environment.

The first signal is normally a d.c. signal whose value is proportional to the temperature. This combines with the sloping signal to produce triggering of a switch at varying times, dependant upon the value of the d.c. signal, the slope of the sloping signal and the voltage needed to trigger the switch which controls the heat supply. For example, of a large temperature deviation is detected, a large d.c. signal is produced and this, in combination with the sloping edge signal will trigger the supply switch for longer periods of time so that a greater corrective response is made. In this way, proportional control is obtained. Reset response is preferably obtained by integrating or averaging the d.c. signal and varying the on time of the square wave in response to this time-averaged value. The averaging is perferably performed by means of a filter which has a time constant greater than the time constant of the temperature-controlled environment. The time-constant of the environment is, of course, the time taken for the environment to respond to a corrective control response e.g. input of heat.

The invention is described with particular reference to the thermostatic control of a bath but it is also useful for controlling the temperature of other temperature-controlled environments such as ovens, refrigerators, and rooms. It may be used to control environments which are held at an elevated temperature for example, by controlling the supply of electrical current to electrical heaters, or controlling the supply of steam, hot air or gas by means of suitable valves which can be operated by servo mechanisms actuated by this control circuit. With environments held at a temperature below ambient, the supply of refrigerant or coolant may be regulated by suitable servo valves actuated by the control circuit.

The circuit permits substantial electrical currents to be switched without creating R. F. interference. This is particularly useful in laboratories and other places which contain apparatus which is sensitive to stray R. F. fields. In addition, the apparatus permits a greater degree of latitude in choosing heater (or coolant) power appropriate to the thermal cpacity of a given environment. This is made possible by the particularly efficient proportional and reset control embodied in the circuit.

An alarm system may be provided to provide a warning if the temperature of the bath deviates from the desired setting for more than a few minutes. A suitable circuit operates on the principle that when the bath is operating properly at the set point, the control heater operates about half the total time. The proportion of the time during which the control heater is on can be summed by an integrator and averaged over a period of about several minutes. If the amount of time during which the heater is on deviates intolerably from the ideal half, an output signal is produced and indicates that the deviation is higher than a preset limit or lower than a preset limit so that appropriate correction action can be taken.

The temperature control unit is particularly useful for controlling the temperature of viscometer baths, particularly the bath for an automatic viscometer of the type described in U.S. Pat. No. 3,798,960, the disclosure of which is incorporated herein by reference. The viscometer bath may be heated by two heaters — a main heater to compensate for most of the thermal losses and a control heater to provide close control over the temperature. As this viscometer may use a computer for control of the various functions, it is particularly desirable to use the same computer for monitoring the operation of the present control circuit.

DESCRIPTION OF PREFERRED EMBODIMENTS

Figure 1:
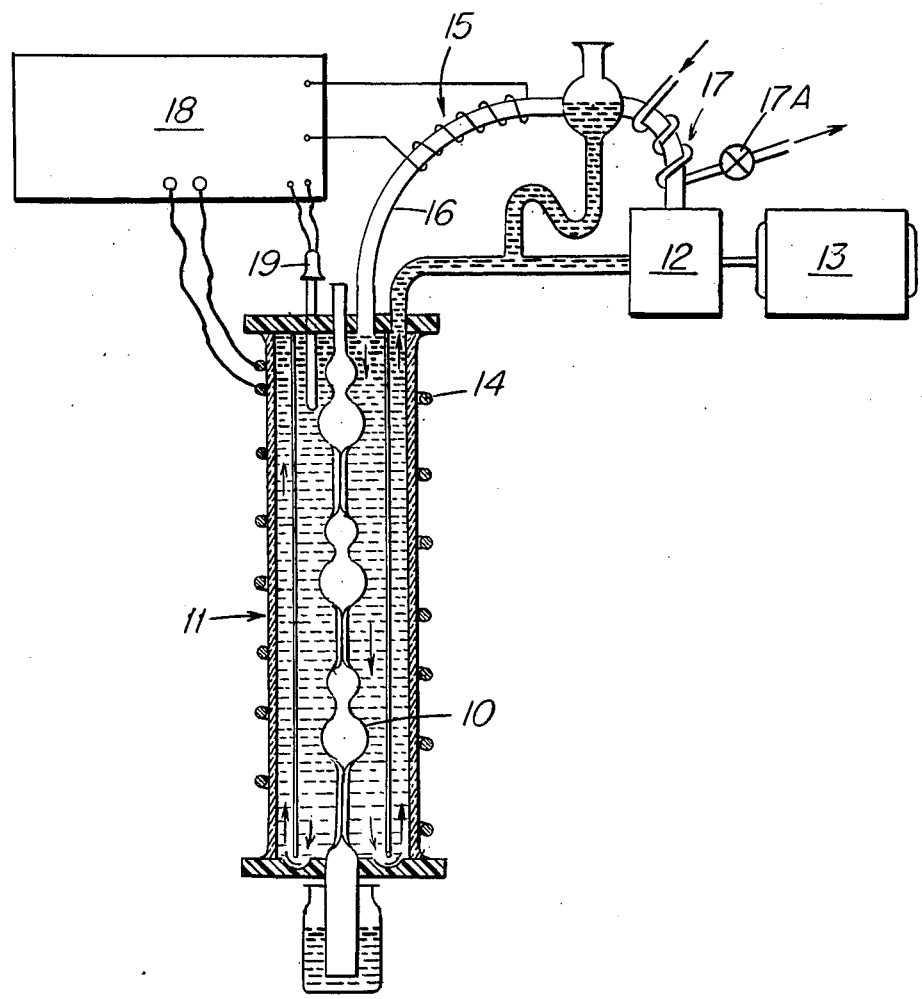
FIG. 1 is a schematic representation of a viscometer bath with a main heater and a control heater operated by a temperature controller.

The viscometer shown in FIG. 1 of the accompanying drawings is of the type described in U.S. Pat. No. 3,798,960. It comprises a viscometer tube 10 in a thermostat bath 11 through which water is circulated by means of pump 12 driven by motor 13. The main bath heater 14 offsets most of the thermal losses and, by being around the bath in the form of a vertical coil, it helps to maintain an even temperature in all parts of the bath. A control heater 15 is wound around the circulation return pipe 16 from pump 12. A cooling coil 17 is also coiled around pipe 16, and through this coil cold water may be circulated to exert further control in the bath temperature. Control of the circulation may be effected by a valve 17A in the circulation system.

The main heater 14 and control heater 15 are controlled by a temperature controller 18 which is also connected to a thermistor 19 for sensing the bath temperature.

Figure 2:
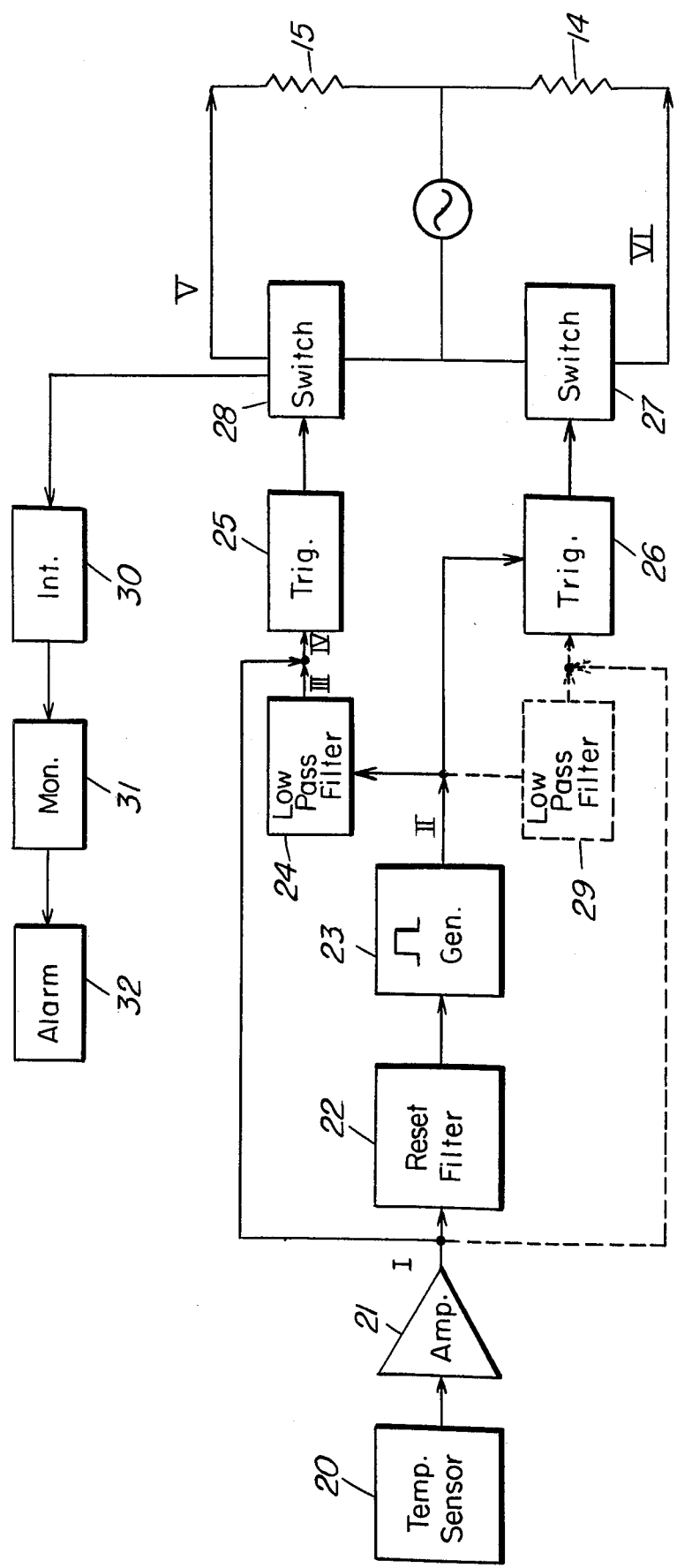
FIG. 2 is a schematic circuit block diagram of a preferred type of temperature controller.

A block diagram of the circuit is shown in FIG. 2 of the accompanying drawings. A temperature sensor or thermistor 20 is connected to a buffer amplifier 21 which may have one or more stages and this, in turn, is connected through a reset filter 22 having a time constant greater than that of the bath, to a square wave oscillator or generator 23. The square wave generator produces an output signal in which the on/off ratio varies in proportion to the temperature sensed by thermistor 20. The output signal passes through a low pass filter 24 to a trigger 25. Filter 24 has a time constant somewhat longer than the length of one cycle of the square wave generator 23. The square wave generator is also connected directly to a second trigger 26. Triggers 25 and 26 are connected to switches 27 and 28 for the main heater 14 and control heater 15, respectively. The switches 27 and 28 are preferably thyristors (silicon controlled rectifiers for half wave operation or triacs for full wave operation) and the triggers are preferably zero-voltage switches which provide the triggering pulses to the gates of the thyristors when the instantaneous value of the a.c. line voltage is zero.

The operation of the circuit is as follows. The Roman reference characters in FIG. 2 indicate the waveforms in that part of the circuit, as shown in FIG. 5.

Figure 5:
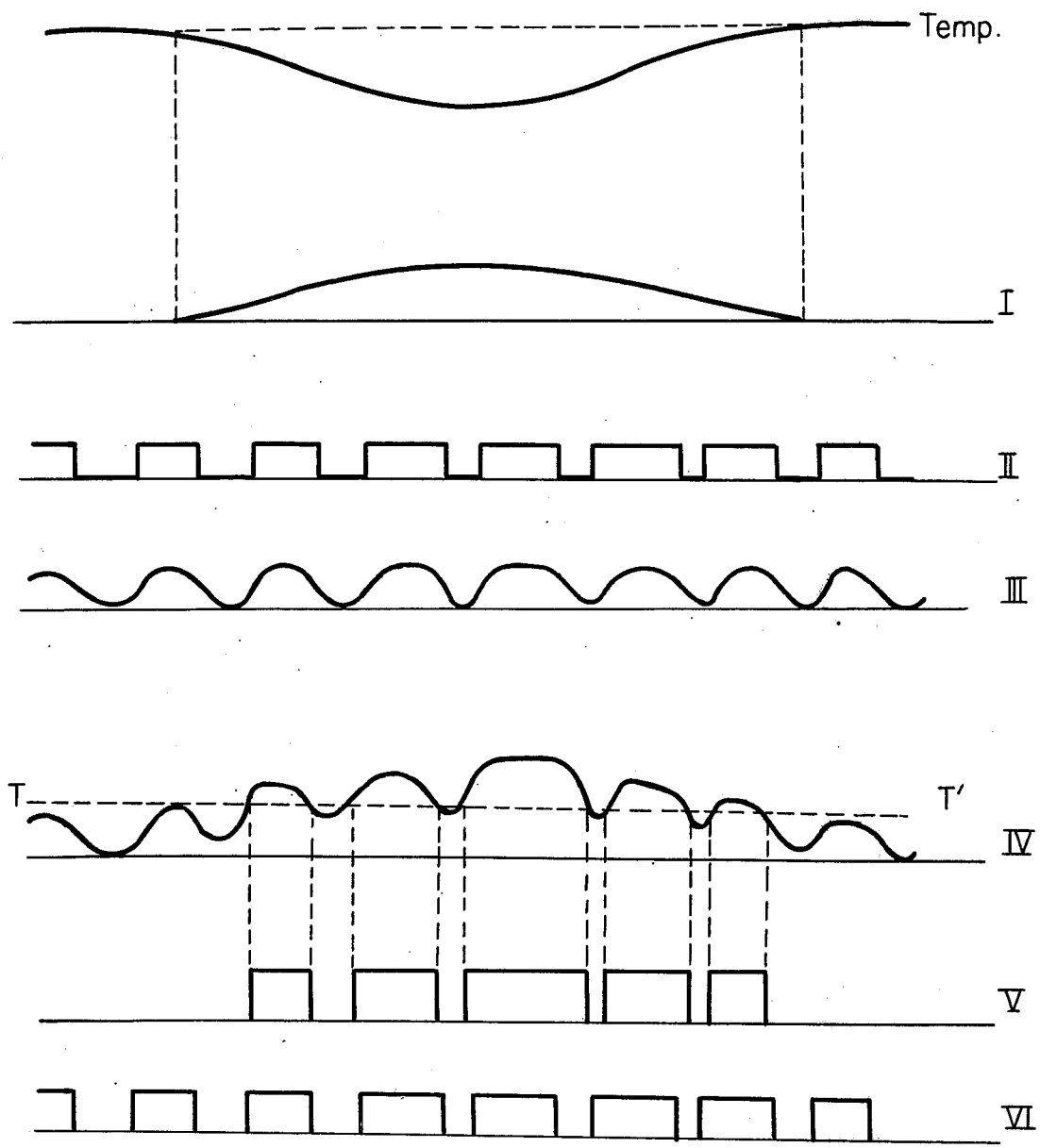
FIG. 5 is a diagram showing the waveforms at different portions of the circuit.

When the temperature deviates from the set point, as shown in the temperature curve in FIG. 5, the buffer amplifier 21, under the control of temperature sensor 20, produces a proportionate output, as shown by curve I. The output from the amplifier is delayed and averaged by the reset or integrating filter 22. The square wave generator produces a square wave of constant frequency but of varying on/off ratio. The on/off ratio is proportional to the averaged output from the reset filter 22, as shown in waveform II. On passing through the low pass filter 24, the square wave is cconverted to a waveform which increases and decreases with time, i.e. a waveform with sloping edges as shown in waveform III. This is combined with the output from amplifier 21 to produce waveform IV which is fed to the sensor input of trigger 25. When the signal voltage applied to the sensor input of trigger 25, is greater than its critical level, indicated as T–T' in waveform IV, it produces pulses which trigger switch 28 into the conducting state, thus closing the circuit including heater 15. Signals I and III combine to form signal IV which actuates the trigger for varying lengths of time. The length of time during which the trigger is enabled depends (i) on the value of signal I and therefore on the deviation from the set point and (ii) on the averaged output signal from the reset filter 22.

Thus, proportional control is provided by (i) and reset control by (ii).

The current to heater 15 is supplied whenever the trigger is enabled, as shown in waveform V.

The main bath heater is provided with reset control by passing the square wave signal II directly to trigger 26 so that it is enabled by each pulse from the generator. The current to heater 14 then takes the form shown in waveform VI. However, if desired, both proportional and reset control may be applied by employing the circuiting shown in dotted lines instead of the direct connection between square wave generator 23 and trigger 26. This circuiting will include the second low pass filter 29 and it will operate in the same manner as the circuit operating trigger 25.

As an alternative, the output from amplifier 21 could be connected directly to trigger 26 and low pass filter 29 and the connection between square wave generator 23 and trigger 26 omitted in this case, the main heater 14 would only be switched on when the deviation from the set point exceeded a certain minimum. Suitable biasing of the trigger about its critical point will, of course, determine the signal required to enable it and therefore, will affect the value of the temperature deviation which will switch the heater on or off.

As triggers 25 and 26 normally trigger the thyristor switches 27 and 28 every time the a.c. line voltage passes through zero if a triac is used or every time if an SCR is used, the time constant of the square wave generator is selected to be relatively long compared to the a.c. supply frequency but considerably less than the time constant of the bath. I have found that a pulse repetition frequency of about $0.5^{Hz}$ is satisfactory.

An alarm circuit is preferably included in order to provide an audible or visible alarm signal, or both, if the temperature deviates from the set point for a substantial period time or if an excessive temperature deviation occurs at all. For this purpose, switch 28 is connected to an integrator 20 which averages the amount of time the control heater 15 is turned on over a period of several minutes. If this differs substantially from on-half of the total time an output signal is generated by a monitor 31 and fed to alarm circuit 32 which provides an audible or visual alarm and may also take an appropriate corrective action.

Figure 3:
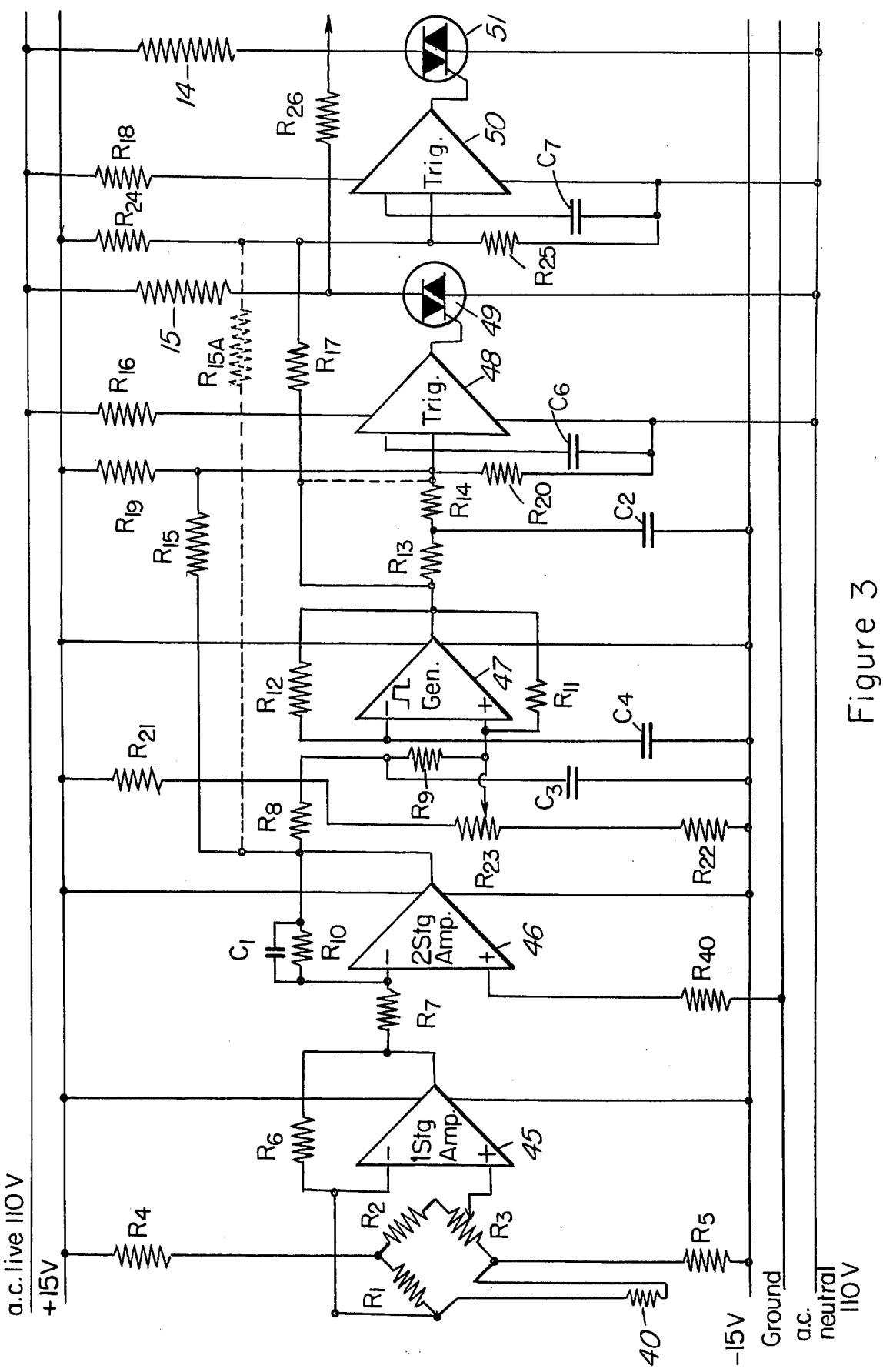
FIG. 3 is a schematic circuit diagram of a preferred type of temperature controller.

In the circuit shown in FIG. 3 of the accompanying drawings, the thermistor 40 is connected in a bridge circuit with fixed resistors $R_1$, $R_2$ and potentiometer $R_3$. Resistors $R_4$ and $R_5$ provide the correct operating current for the thermistor input. A first stage operational amplifier 45 is connected across the bridge to receive an output proportional to the deviation from the set point. The potentiometer $R_3$ provides adjustment of the set point so that when the bath temperature is at the set point, no current flows to the amplifier. The gain of the amplifier can be adjusted by feed back resistor $R_6$ which is connected between the output and the inverting input of amplifier 45. The output from first stage amplifier 45 is taken to the inverting input of a second stage amplifier 46 by means of coupling resistor $R_7$. The non-inverting input is connect to ground by means of resistor $R_{40}$. The output from second stage amplifier 46 is fed to the non-inverting input of another operational amplifier functioning as a square wave generator 47, via a reset filter comprising resistors $R_8$ and $R_9$ and capacitor $C_3$. The values of these are chosen so that the time constant of the filter is greater than the time constant of the bath. This provides reset action, as explained below.

Feed back for amplifier 46 is provided by resistor $R_{10}$ and capacitor $C_1$. The feed back necessary for amplifier 47 to function as a square wave generator is provided by resistor $R_{11}$ connected in the circuit to the non-inverting input of the amplifier and resistor $R_{12}$ connected in the circuit to the inverting input. The values of these resistors and of capacitor $C_4$ control the frequency of the square wave generator. As mentioned above, this should be long compared to the frequency of the a.c. supply but considerably less than the time constant of the bath, about 0.5 hz. being satisfactory.

The output from square wave generator 47 passes through a low pass filter comprising resistors $R_{13}$ and $R_{14}$ and capacitor $C_2$. This filter which, as explained above, has a time constant somewhat longer than the length of one cycle of the square wave generator, rounds off the square wave to produce the signal which increases and decreases with time, i.e. has sloping leading and trailing edges. This filter is connected to the sensor input of a first zero voltage trigger switch 48. The trigger is also connected across the a.c. power supply by means of resistor $R_{16}$ to provide a.c. power to the zero-voltage triggering circuit.

The output of the second stage amplifier 46 passes through the coupling resistor $R_{15}$ and is combined with the rounded square wave so that the composite signal is applied to the sensor input of the trigger 48.

The output from trigger 48 is fed to the gate of a triac 49 in series across the a.c. supply with the control heater 15.

The output from the square wave generator 47 is also connected by coupling resistor $R_{17}$ to a second zero voltage trigger switch 50 which is also connected across the a.c. supply by resistor $R_{18}$ to provide a.c. power for the zero voltage triggering. The output from trigger 50 is fed to the gate of a second triac 51 in series across the a.c. supply with the main bath heater 14.

The circuit operates as follows:

A decrease in the bath temperature increases the resistance of the thermistor 40 and this makes the inverting input of the first stage operational amplifier 45 more positive and this produces a more negative output signal from the amplifier. This, in turn, leads to a more positive output from the second stage amplifier 46. This output is fed to the sensor input of trigger 48 which is biased by resistors $R_{19}$ and $R_{20}$ at its critical point. When the sensor input is more positive than the critical point and instantaneous value of a.c. line voltage is less than 2 volts, the trigger 48 sends out 100 microsecond triggering pulses to the gate of triac 49 causing it to conduct current at the next half cycle and subsequent cycles thus supplying power to the control heater 15. When the resulting rise in bath temperature is detected by thermistor 40 the sequence is reversed and triac 49 is not triggered into the conducting state.

The square wave generator 47 produces square wave pulses at a pulse repetition frequency of about 0.5 Hz. and this signal is filtered by resistors $R_{13}$ and $R_{14}$ and capacitor $C_2$ so that a rounded waveform voltage is combined with the output from second stage amplifier 46 and applied to the input of trigger 48. The combined input signal causes the control heater 15 to go on in proportion to the deviation of the temperature from the set point. Thus, proportional regulation of the temperature is achieved.

The main heater 14 is fed power by triac 51 which is triggered by triggering switch 50 in response only to the square wave output from generator 47. Bias to trigger 50 is supplied by resistors $R_{24}$ and $R_{25}$. Thus, the triac is triggered only in response to the output from the square wave generator 47.

The on/off ratio of the square wave generator can be adjusted by the biasing resistors $R_{21}$ and $R_{22}$ with fine adjustment provided by potentiomer $R_{23}$. Ideally, the control heater should be on half the time and this can be regulated indirectly by setting of $R_{23}$.

To provide for slow automatic adjustment of the on/off ratio of the square wave generator, the output from the second stage amplifier is delayed and averaged by resistors $R_8$ and $R_9$ and capacitor $C_3$. The amount of time during which the square wave generator 37 is "on" increases as the input signal to the non-inverting input is made positive. Thus, the greater the decrease in bath temperature, the greater will be the on time of the square wave generator during any one cycle and, correspondingly, the longer both heaters will be on to correct the temperature. The output from the second stage amplifier is, however, integrated or averaged by the reset filter and this prevents the square wave generator from responding immediately to very small, short duration deviations from the set point and the effect of minor positive and negative deviations is averaged out. The input to the square wave generator is therefore indicative only of substantial or long term deviations from the set point. As the square wave generator controls main heater 14 completely and control heater 15 partly, these deviations will be compensated by appropriate corrective responses. Thus, reset (or integrated or averaged) control of the temperature is achieved, together with the proportional control as previously described.

The reset action provided in this way can be increased by increasing the values of the bias resistors $R_{21}$ and $R_{22}$ but this will also decrease the frequency of the generator. The frequency may, however, be increased to its desired value by increasing the value of feed back resistor $R_{11}$ connected to the non-inverting input. A change in frequency is undesirable as this will affect the filtering of the square wave signal applied to the trigger 48. The reset action can be applied sooner by decreasing the value of capacitor $C_3$, but if the reset is excessive, the bath temperature may hunt.

If proportional and reset control is desired on both heaters the second trigger 50 may also be connected to the second stage amplifier 46 by means of a coupling resistor $R_{15A}$, as shown by the dotted line, and coupling resistor $R_{17}$ connected instead to the output of the low pass filter network as shown by the dotted line, the second trigger will operate in both the reset and proportional modes.

Figure 4:
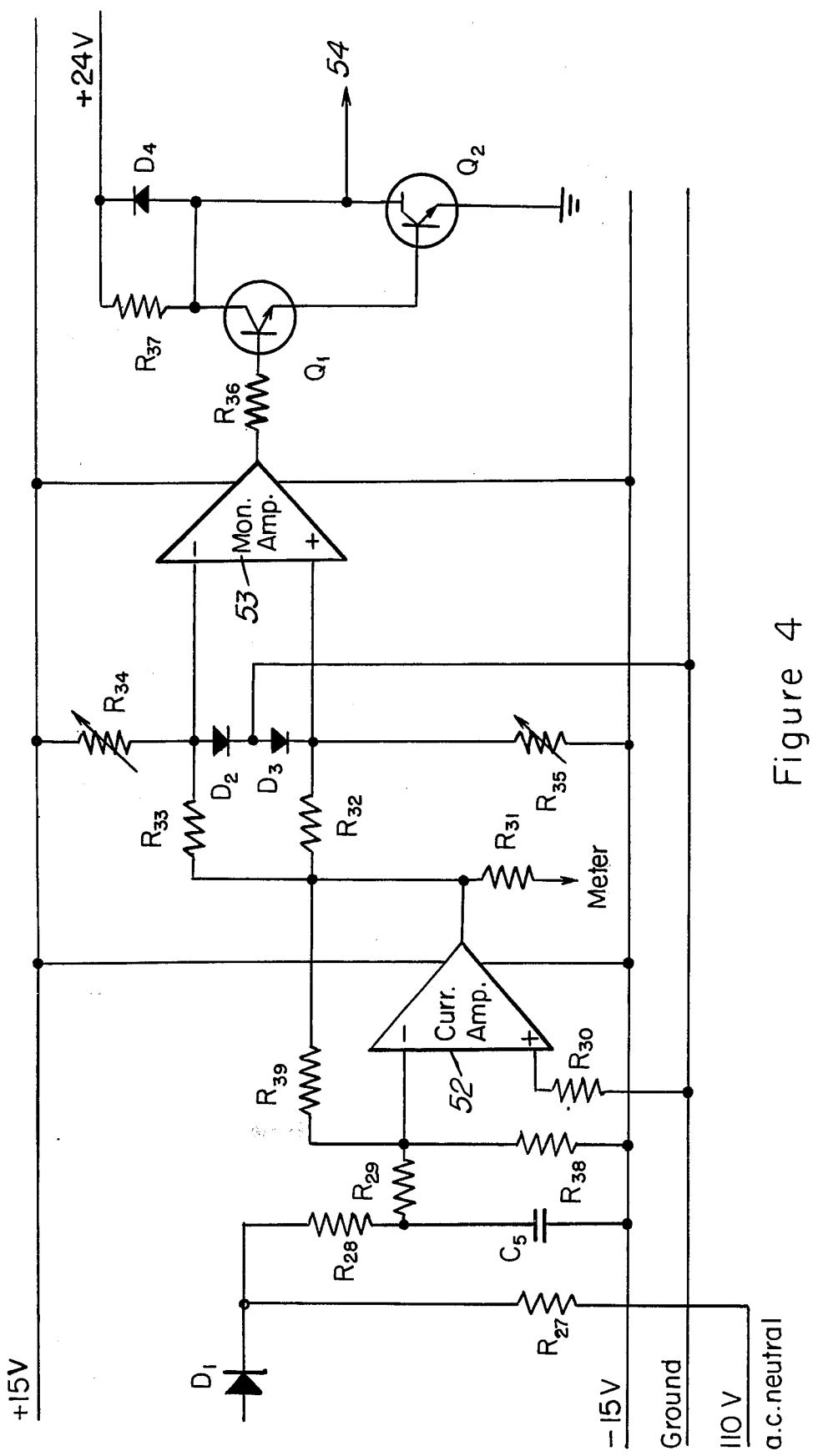
FIG. 4 is a schematic circuit diagram of one form of alarm circuit for the temperature controller.

The alarm circuit shown in FIG. 4 of the accompanying drawings operates on the principle that when the bath is operating properly at the set point the control heater is on about half of of time. The operation of the control heater is sensed by the diode resistor network connected to the circuit including triac 49 and resistors $R_{26}$ (FIG. 3) and $R_{27}$ and diode $D_1$. These are connected to an integrator which, in this case, is provided by resistors $R_{28}$ and $R_{29}$ and capacitor $C_5$.

The integrator is connected to the inverting input of an operational current amplifier 52 which has a feed back resistor $R_{39}$ to control gain and which is provided with a reference potential to the non-inverting input supplied through isolation resistor $R_{30}$, and to the inverting input by resistor $R_{38}$. Half cycle positive pulses are fed to the integrator when the heater 49 is off. The integrator smooths the pulses and also averages the off time of the heater over several minutes. The resulting signal is amplified by amplifier 52. When the heater is off half the time, the current amplifier output is zero. When it is off more than half the time, the output is negative and when it is off less than half the time, the output is positive. The output signal may be fed through resistor $R_{31}$ to a meter (not shown) which indicates the operational status of the control heater 15.

For alarm purposes, the output from the integrator and amplifier 52 is also fed through a diode resistor network comprising resistors $R_{32}$ and $R_{33}$ and diodes $D_2$ and $D_3$ to both the inverting and non-inverting inputs of an operational amplifier 53 acting as a monitor. When the output signal from the amplifier 52 is zero, the inverting input of the amplifier is biased by input and, in this event, the output from the amplifier will be negative. When the output signal from amplifier 52 is negative, it is applied to the inverting input of amplifier 53 but is passed to ground by diode $D_3$. Thus, the inverting input to amplifier 53 will be more negative than the non-inverting input and the output from amplifier 53 will be positive. When the output signal from amplifier 52 is positive, it is applied to the non-inverting input of the amplifier 53 but is passed to ground by diode $D_2$ connected to the inverting input. Thus, the inverting input will again be more negative than the non-inverting input and the output of the amplifier 53 will again be positive.

The operation of the alarm circuit can be easily seen from the following truth table, in which the upper alarm limit is set, by way of example, at 87% ON time and the lower limit at 13% ON time.

| Heater % ON time | Curr. Amp. output | Monitor | | |
|---|---|---|---|---|
| | | Non-inv. input | Inv. input | output |
| 87 to 100 | + | + | − | + |
| 13 to 86 | 0 | − | + | − |
| 0 to 13 | − | + | − | + |

The output of amplifier 53 is connected by resistor $R_{36}$ to the base of the input transistor $Q_1$ of an emitter follower (Darlington) driver circuit comprising transistors $Q_1$ and $Q_2$ with resistor $R_{37}$ and diode $D_4$. When the output from amplifier 53 is negative, transistor $Q_1$ is biased into the non-conducting state and this, in turn, holds transistor $Q_2$ in the non-conducting state. However, when the output from amplifier 53 is positive, transistor $Q_1$ is biased into the conducting state, as is transistor $Q_2$, so that output connection 54 is shorted to ground. Diode $D_4$ prevents damage to the transistors if an inductive load such as a solenoid is switched.

The shorting of the output connection 54 can be detected by a suitable detector circuit and an alarm given. A computer may be programmed to sound an audible alarm, type a message or take appropriate action.

If the resistance of the bias resistor $R_{34}$ in the inverting input circuit of amplifier 53 is increased, the positive bias on the inverting input will be decreased and less negative signal will be required and therefore if the heater is off only slightly more than half the time, an alarm will be given. If the bias of the non-inverting input of amplifier 53 is decreased by increasing the value of bias resistor $R_{35}$ less positive signal will be required and thus an alarm will be given if the heater is off only slightly less than half the time.

The variations from 50% on time correspond to variations from the set point. Thus by increasing $R_{34}$ the upper temperature limit at which the alarm will occur can be set closer to the set point. Also by increasing $R_{35}$ the lower temperature alarm limit can be set closer to the set point. Different settings of $R_{34}$ and $R_{35}$ may be needed. Thus since overheating of the bath is usually more damaging than underheating, $R_{34}$ would be greater than $R_{35}$ to give less tolerance to overheating.

As well as operating electrical heaters, as described above, the circuit may be used to control cooling devices. For example, a refrigerator unit could be turned on or off by the circuit directly or the circuit could be used to operate valves by means of suitable servo mechanisms to admit coolants or refrigerants to a temperature-controlled environment. In the viscometer bath described above, the flow of cooling water through coil 17 can be regulated by a servo-operated valve which is controlled by the control circuit. As an alternative to electrical heaters, steam, hot air or gas supply could be regulated by servo-operated valves controlled by the control circuit. Servo control of this kind could be obtained, for example, by using an analog computer to sense the current pulses from the triggers or the thyristors described above and making the appropriate control responses. As an alternative to the analog computer, an appropriately programmed digital computer can take the necessary action.

The operational amplifiers used in this circuit may be integrated circuit operational amplifiers such as the Fairchild $\mu$A741. The zero voltage trigger switches may also be integrated circuits for compactness and the RCA CA3059 is highly suitable. If these components are used, resistors $R_{16}$ and $R_{18}$ and capacitors $C_6$ and $C_7$ are used to provide the correct power supply for the triggers. The values of the various resistors and capacitors in the circuit may, for preference, be as follows with the Fairchild $\mu$A741 amplifiers and the RCA CA3059 trigger switch:

| | |
|---|---|
| $R_6$ | 220 k$\Omega$ |
| $R_7$, $R_{16}$, $R_{18}$, $R_{26}$, $R_{40}$ | 10 k$\Omega$ |
| $R_8$, $R_9$, $R_{21}$, $R_{28}$ | 1 M$\Omega$ |
| $R_{10}$, $R_{11}$, $R_{12}$, $R_{30}$ | 470 k$\Omega$ |
| $R_{13}$, $R_{14}$, $R_{27}$, $R_{31}$, $R_{32}$, $R_{33}$ | 100 k$\Omega$ |
| $R_{28}$, $R_{29}$ | 2.2 M$\Omega$ |
| $R_{34}$, $R_{35}$ | 0.2 to 1 M$\Omega$ |
| $R_{38}$ | 2.7 M$\Omega$ |
| $R_{15}$, $R_{15A}$ | 150 k$\Omega$ |
| $R_{17}$ | 82 k$\Omega$ |
| $R_{19}$, $R_{24}$ | 68 k$\Omega$ |
| $R_{20}$, $R_{25}$ | 22 k$\Omega$ |
| $R_{22}$ | 1.8 M$\Omega$ |
| $R_{23}$ | 0-500 k$\Omega$ |
| $R_{36}$ | 47 k$\Omega$ |
| $R_{37}$ | 1.5 k$\Omega$ |
| $C_1$ | 0.01 $\mu$F |
| $C_2$ | 4.7 $\mu$F |
| $C_3$ | 250 $\mu$F |
| $C_4$ | 2.2 $\mu$F |
| $C_5$, $C_6$, $C_7$ | 100 $\mu$F |

With these components used in the alarm circuit, the upper alarm limit of 87% heater ON time and the lower alarm limit of 13% ON time will be given when $R_{34} = R_{35} = 0.47$ M.

The Fairchild $\mu$A741 operational amplifier is disclosed in the Fairchild $\mu$A741 data sheet, May 1968, copyright Fairchild Semicondutor 1968, 313 Fairchild Drive, Mountain View, California, and the RCA - CA3059 zero voltage switch is described in RCA Application Note ICAN-4158, March 1970, the disclosures of which are incorporated herein by reference.

Although specific embodiments of the invention are described above, they are by way of illustration only and the invention is not to be limited thereto.

What I claim is:

1. A method of controlling the temperature of a temperature-controlled environment, which comprises:
   1. sensing the temperature of the environment,
   2. generating a first signal in proportion to the deviation of the temperature from a predetermined reference temperature,
   3. varying the duration of the deviation of a second signal from a reference level in response to the first signal,
   4. deriving from the second signal a third signal having a value which varies with time,
   5. controlling the supply of heat to the environment in response to the first and third signals.

2. A method according to claim 1 in which the second signal comprises a square wave signal of constant frequency whose on/off ratio is varied in proportion to the first signal.

3. A method according to claim 2 in which the square wave signal is filtered to produce, as the third signal, a rounded square wave signal.

4. A method according to claim 3 in which the first and third signals are combined to control the supply of heat.

5. A method according to claim 1 in which the first signal is averaged and the duration of the deviation of the second signal from the reference level is varied in proportion to the averaged first signal.

6. A method according to claim 5 in which the first signal is averaged by means of a low pass filter.

7. A method according to claim 6 in which the time constant of the filter is greater than the time constant of the temperature-controlled environment.

8. A method of controlling the temperature of a temperature-controlled environment, which comprises the steps of:
   1. sensing the temperature of the environment,
   2. generating a first signal in proportion to the temperature so sensed,
   3. averaging said first signal,
   4. generating a square wave signal of constant frequency and having an on/off ratio proportionate to the averaged first signal,
   5. filtering said square wave signal by means of a low pass filter having a time constant approximately equal to that of the square wave to produce a rounded square wave signal having sloping leading and trailing edges,
   6. combining the averaged first signal with the rounded square wave signal,
   7. controlling the supply of heat to the environment in response to the combined averaged first signal and the rounded square wave signal.

9. A method acccording to claim 8 in which the heat is supplied to the environment by means of an electrical heater to which the electrical supply is controlled in response to the combined averaged first signal and the rounded square wave signal.

10. A method according to claim 9 in which the electrical supply to the heater is controlled by means of a switch triggered by means of a trigger having a critical triggering level which is exceeded periodically by the combined averaged first signal and the rounded square wave signal.

11. Apparatus for controlling the temperature of a temperature-controlled environment, comprising:
   1. temperature sensing means for sensing the temperature of the environment,
   2. first signal generating means connected to the temperature sensing means for producing a first signal in proportion to the temperature,
   3. second signal generating means operatively connected to the first signal generating means for producing a second signal having a periodic deviation from a reference level, the duration of the deviation from the reference level being in proportion to the first signal, 4. means for deriving from said second signal a third signal having a value which varies with time,
5. heat supply control means operatively connected to the first signal generating means and the third signal generating means for controlling the supply of heat to the environment in response to the first and third signals.

12. Apparatus according to claim 11 in which the temperature sensing means comprises a thermistor.

13. Apparatus according to claim 11 which means for delaying the first signal is operatively interposed between the first signal generating means and the second signal generating means.

14. Apparatus according to claim 11 which the second signal generating means comprises square wave generator means for generating a square wave output signal of constant pulse repetition frequency the on/off ratio of which is proportional to the first signal.

15. Apparatus according to claim 14 in which the time constant of the square wave generator means is less than the time constant of the temperature-controlled environment.

16. Apparatus according to claim 15 in which the means for deriving the third signal from the second signal comprise low pass filtering means having a time constant similar to that of the square wave generator means.

17. Apparatus according to claim 11 in which the temperature-controlled environment is heated by means of electrical heaters, the heat supply control means comprising:
   1. thyristor triggering means operatively connected to the square wave generator means, and
   7. a thyristor connected in series with the electrical heater, with the gate thereof connected to the triggering means.

18. Apparatus according to claim 17 in which the thyristor triggering means includes means for generating thyristor triggering pulses when the combined first and third signals exceed a critical triggering level and when the instantaneous value of the volage of an alternating current supply connected to the thyristor and the thyristor triggering switch means is substantially zero.

19. Apparatus according to claim 17 and including detecting means for detecting when the heater is operating for a predetermined proportion of the total time and means for providing an alarm if the said heater operates for a proportion of the total time above a first preset limit or below a second preset limit.

20. Apparatus according to claim 19 including integrating means for averaging the proportion of the total time during which said heater operates.

21. In an apparatus for supplying heat to a temperature-controlled environment by means of an electrical heating means, including a.c. electrical current supply means, temperature sensing means, and means for regulating the supply of electrical current to the electrical heating means in response to the temperature of the environment as sensed by the temperature sensing means, the improvement in the means for regulating the supply of elctrical current, comprising in combination:
   1. first signal generating means operatively connected to the temperature sensing means and adapted to produce a first signal proportional to a deviation of the sensed temperature from a predetermined reference temperature.
   2. signal averaging means operatively connected to the first signal generating means, having a time constant greater than the time constant of the temperature-controlled environment and adapted to time average the first signal,
   3. constant frequency square wave generator means operatively connected to the signal averaging means and having a time constant less than that of the temperature-controlled environment, the square wave generator means adapted to produce a square wave signal of constant pulse repetition frequency and of variable on/off ratio, the on/off ratio of the signal being proportional to the averaged first signal,
   4. low pass filter means operatively connected to the square wave generator means and having a time constant similar to that of the square wave generator means, adapted to derive from the square wave signal produced by the square wave generator means a rounded square wave signal having sloping edges,
   5. thyristor triggering means having a critical triggering level and adapted to produce thyristor triggering pulses at an output thereof when said critical triggering level is exceeded by an input signal, the thyristor triggering means being operatively connected at its input to the first signal generating means and the low pass filter means whereby said thyristor triggering means is actuated when the combined value of said first signal and rounded square wave signal exceeds the critical triggering level,
   6. thyristor switch means in series with the electrical heater having its gate operatively connected to the output of the thyristor triggering means and adapted to conduct electrical current to the heater when triggered by said triggering pulses at the gate 22. In the apparatus of claim 21, thyristor triggering means adapted to produce triggering pulses when the instantaneous value of voltage of tha a.c. supply is substantially zero.

* * * * *